United States Patent
Choi

(10) Patent No.: US 9,020,460 B2
(45) Date of Patent: Apr. 28, 2015

(54) SMART ALARM PROVIDING TERMINAL AND ALARM PROVIDING METHOD THEREOF

(75) Inventor: Seheon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 13/428,581

(22) Filed: Mar. 23, 2012

(65) Prior Publication Data

US 2013/0252569 A1 Sep. 26, 2013

(51) Int. Cl.
*H04M 11/04* (2006.01)
*G06F 3/16* (2006.01)
*H04M 1/725* (2006.01)
*G04G 13/02* (2006.01)
*G04G 21/06* (2010.01)

(52) U.S. Cl.
CPC ......... *H04M 1/72566* (2013.01); *G04G 13/023* (2013.01); *G04G 13/026* (2013.01); *G04G 21/06* (2013.01); *G06F 3/167* (2013.01); *H04M 2250/74* (2013.01)

(58) Field of Classification Search
CPC ... H04W 88/02; H04W 68/00; G04G 13/026; G06F 3/167
USPC ........................................................ 455/404.1
See application file for complete search history.

(56) References Cited

U.S. PATENT DOCUMENTS

| | | | |
|---|---|---|---|
| 6,965,863 B1 * | 11/2005 | Zuberec et al. | 704/270 |
| 7,506,035 B1 * | 3/2009 | Lu | 709/219 |
| 2006/0195324 A1 * | 8/2006 | Birk et al. | 704/275 |
| 2006/0277308 A1 * | 12/2006 | Morse et al. | 709/227 |
| 2009/0278668 A1 * | 11/2009 | Choi et al. | 340/309.16 |
| 2014/0164920 A1 * | 6/2014 | Satou | 715/708 |

* cited by examiner

*Primary Examiner* — Marisol Figueroa
(74) *Attorney, Agent, or Firm* — Birch, Stewart, Kolasch & Birch, LLP

(57) ABSTRACT

Disclosed are a smart alarm providing terminal and an alarm proving method thereof. The smart alarm providing terminal includes an alarm unit to drive an alarm of the terminal, a voice conversation unit to perform a voice conversation function between a user and the terminal, a user information provision unit to provide different personalized information according to respective users, a memory unit to store data to perform the voice conversation function and to provide the personalized information, and a controller to control the voice conversation unit and the user information provision unit so as to enable the voice conversation function and provision of the personalized information when the alarm of the terminal is driven.

20 Claims, 11 Drawing Sheets

FIG. 7

| Daily Briefing Items | Score |
|---|---|
| Weather | 5 |
| News | 5 |
| Stocks | 5 |
| ⋮ | ⋮ |
| Calls during absence | 5 |
| Temperature | 5 |
| Traffic information | 5 |

| Daily Briefing Items | Score |
|---|---|
| Weather | 5 |
| News | 4 |
| Stocks | 4 |
| ⋮ | ⋮ |
| Calls during absence | 6 |
| Temperature | 6 |
| Traffic information | 5 |

SMART ALARM PROVIDING TERMINAL AND ALARM PROVIDING METHOD THEREOF

BACKGROUND OF THE INVENTION

1. Field of the Invention

The present invention relates to a smart alarm providing terminal and an alarm providing method thereof, and more particularly to, a smart alarm providing terminal an alarm providing method thereof which enable an interactive morning call and provision of daily information personalized to respective users.

2. Discussion of the Related Art

In general, a smart phone has a combination of advantages of a portable phone and a personal digital assistant (PDA), and is obtained by integrating data communication functions, such as schedule management, facsimile transmission/reception and Internet access, to the functions of the portable phone. The most important characteristic of the smart phone is that hundreds of kinds of various applications can be installed, added or deleted as a user wants, differing from conventional portable phones which are put on the market as finished products so as to use given functions.

Further, the smart phone is advantageous in that the smart phone may access Internet through various methods using various browsing programs as well as directly access Internet using a wireless Internet network, a user may directly manufacture a desired application, a user may implement an interface proper thereto through various applications, and smart phones having the same operating system (OS) may possess in common applications between the smart phones, differing from the conventional portable phones.

As terminals using a next generation mobile communication network constructed with a single coverage are generalized, smart phone users increasingly require various functions. From among additional functions of the mobile communication terminals, an alarm function, i.e., a morning call function, is representative. Recently, most mobile communication terminal users use the alarm function, and particularly the morning call function. In order to use the morning call function of a mobile communication terminal, a user sets a desired morning call time and sets an alarm sound to be given at the morning call time, and then the mobile communication terminal performs a morning call while giving the alarm sound at the set morning call time.

SUMMARY OF THE INVENTION

Accordingly, the present invention is directed to a smart alarm providing terminal and an alarm providing method thereof that substantially obviate one or more problems due to limitations and disadvantages of the related art.

An object of the present invention is to a smart alarm providing terminal and an alarm providing method thereof which enable an interactive morning call and provision of daily information personalized to respective users by combining a voice conversation function and a personalized information provision function with an alarm provision function of a smart phone.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a smart alarm providing terminal includes an alarm unit to drive an alarm of the terminal, a voice conversation unit to perform a voice conversation function between a user and the terminal, a user information provision unit to provide different personalized information according to respective users, a memory unit to store data to perform the voice conversation function and to provide the personalized information, a controller to control the voice conversation unit and the user information provision unit so as to enable the voice conversation function and provision of the personalized information when the alarm of the terminal is driven, and a display unit to display start and end of reception of a voice input from the user through color change of a specific character.

The voice conversation unit may receive a voice input from the user, if the alarm unit periodically drives the alarm.

The controller, if the user touches the terminal, may judge such touch to be generation of the voice input, and transmit a voice input signal to the voice conversation unit. The voice input may include an onomatopoeic word indicating stoppage of alarm driving, and when the controller receives the onomatopoeic word indicating stoppage of alarm driving from the user, the controller may stop driving of the alarm by the alarm unit.

The controller may stop driving of the alarm by the alarm unit, when the user presses or touches an alarm driving stoppage button of the alarm unit. If the controller judges that whether or not the received voice input is the onomatopoeic word indicating stoppage of alarm driving is obscure, the controller may require re-input from the user.

If the controller judges that whether or not the voice input received by the voice conversation unit is the onomatopoeic word indicating stoppage of alarm driving is obscure, the controller may control the memory unit so as to store a repetitive pattern of the onomatopoeic word indicating stoppage of alarm driving.

The personalized information may include information regarding weather, news, stocks, calls during absence, messages during absence, temperature and traffic. The memory unit may store database information to record and modify the numbers of user access times to the respective items of the personalized information. Here, the user information provision unit may perform provision of the personalized information in descending order of the numbers of user access times to the respective items of the personalized information.

The terminal may include a smart phone or a smart TV.

In another aspect of the present invention, an alarm providing method of a smart alarm providing terminal includes periodically driving an alarm of the terminal, receiving a voice input from a user, providing different personalized information according to respective users, and performing a voice conversation function between the user and the terminal.

It may be judged that the voice input is generated if the user touches the terminal, and the voice input may include an onomatopoeic word indicating stoppage of alarm driving. When the controller receives the onomatopoeic word indicating stoppage of alarm driving from the user, driving of the alarm of terminal may be stopped, and when the user presses or touches an alarm driving stoppage button of the alarm unit, driving of the alarm of the terminal may be stopped.

If it is judged that whether or not the voice input received by the terminal is the onomatopoeic word indicating stoppage of alarm driving is obscure, the alarm providing method may further include requiring re-input from the user, or storing a repetitive pattern of the onomatopoeic word indicating stoppage of alarm driving.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4(a) to 6(d) are flowcharts illustrating a user information providing method between a user and the terminal in accordance with the embodiment of the present invention; and FIGS. 7 to 11 are plan views illustrating a database to record and modify the numbers of access times of a user to respective items of personalized information to provide user information between the user and the terminal in accordance with the embodiment of the present invention.

DETAILED DESCRIPTION OF THE INVENTION

Hereinafter, a recording/reproducing method and apparatus in accordance with one embodiment of the present invention will be described in detail. Wherever possible, the same reference numbers will be used throughout the drawings to refer to the same or like parts. In this specification, a recording method and apparatus will be exemplarily described in detail for convenience of description.

Although terms used in the present invention are general terms which are widely used now, these terms may be terms arbitrarily selected by the applicant in a specific case, and in this case, it will be understood that these terms, such as those defined in commonly used dictionaries, should be interpreted as having a meaning that is consistent with their meaning disclosed in the corresponding description of the present invention and will not be interpreted in an idealized or overly formal sense unless expressly so defined herein.

Figure 1:
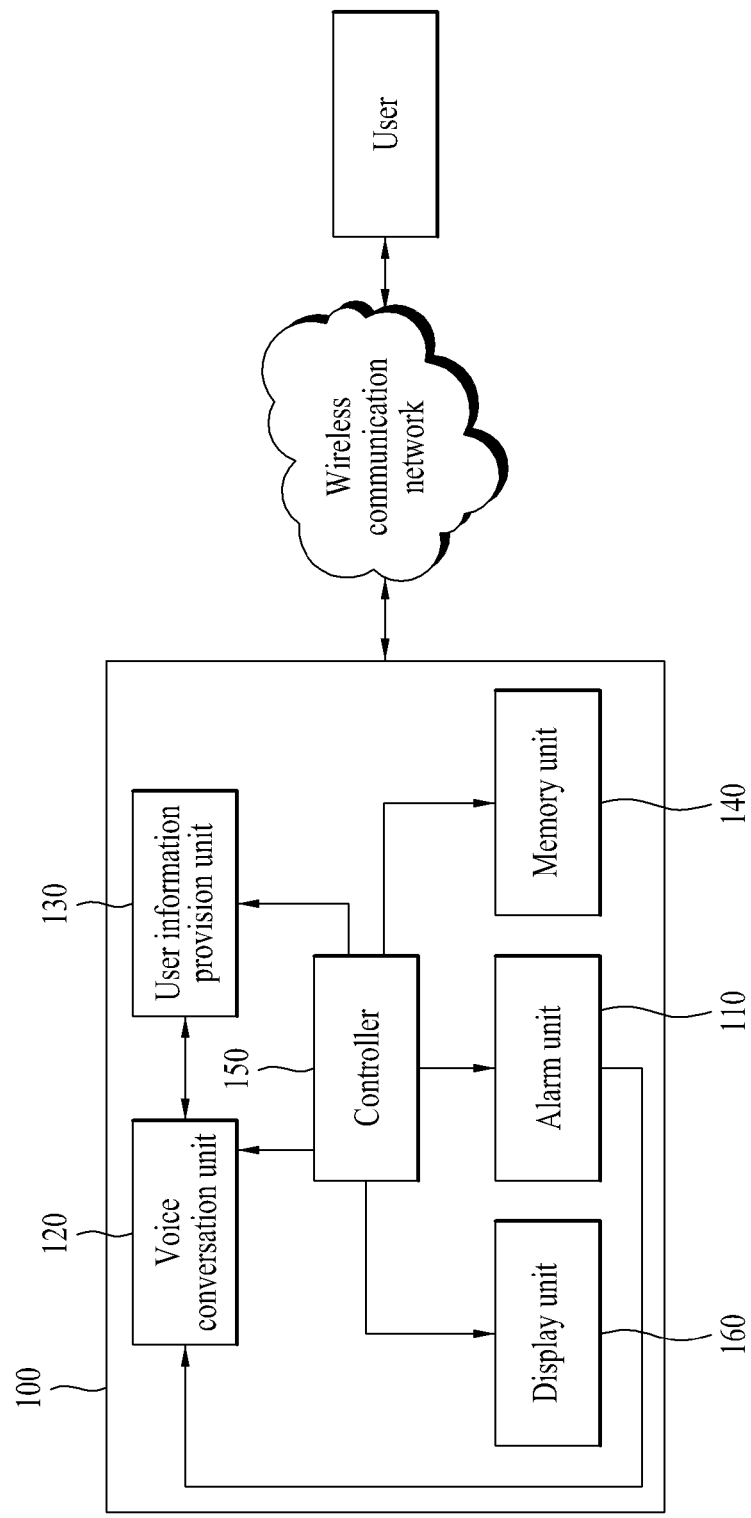
FIG. 1 is a block diagram illustrating the configuration of a smart alarm providing terminal in accordance with the present invention.

FIG. 1 is a block diagram illustrating the configuration of a smart alarm providing terminal 100 in accordance with the present invention.

As shown in FIG. 1, the smart alarm providing terminal 100 includes an alarm unit 110 to drive an alarm of the terminal 100, a voice conversation unit 120 to perform a voice conversation function between a user and the terminal 100, a user information provision unit 130 to provide different personalized information according to users, a memory unit 140 to store data to perform the voice conversation function and to provide the personalized information, a controller 150 to control the voice conversation unit 120 and the user information provision unit 130 so as to enable the voice conversation function and provision of the personalized information when the alarm of the terminal 100 is driven, and a display unit 160 to display start and end of reception of a voice input from the user through color change of a specific character.

The voice conversation unit 120 may receive the voice input from the user, if the alarm unit 110 periodically drives the alarm.

The controller 150, if the user touches the terminal 100, may judge such touch to be generation of the voice input, and may transmit a voice input signal to the voice conversation unit 120. The voice input includes an onomatopoeic word indicating stoppage of alarm driving, and when the controller 150 receives the onomatopoeic word indicating stoppage of alarm driving from the user, the controller 150 may stop driving of the alarm by the alarm unit 110.

Further, the controller 150 may stop driving of the alarm by the alarm unit 110, when the user presses or touches an alarm driving stoppage button of the alarm unit 110. If the controller 150 judges that whether or not the received voice input is the onomatopoeic word indicating stoppage of alarm driving is obscure, the controller 150 may require re-input from the user.

If the controller 150 judges that whether or not the voice input received by the voice conversation unit 120 is the onomatopoeic word indicating stoppage of alarm driving is obscure, the controller 150 may control the memory unit 140 so as to store a repetitive pattern of the onomatopoeic word indicating stoppage of alarm driving.

The personalized information may include information regarding weather, news, stocks, calls during absence, messages during absence, temperature, traffic, etc., and the memory unit 140 may store database information to record and modify the numbers of user access times to the respective items of the personalized information, and may thus manage provision of the personalized information. Here, the user information provision unit 130 may perform provision of the personalized information in ascending or descending order of the numbers of user access times to the respective items of the personalized information.

Further, the terminal 100 may include a smart phone, smart TV, etc., and in the embodiment of the present invention, the smart phone will be described as the terminal 100. However, the terminal 100 is not limited thereto.

FIGS. 2(a) to 2(d) and FIGS. 3(a) to 3(d) are flowcharts illustrating a method for performing a voice conversation function between a user and the terminal in accordance with one embodiment of the present invention.

As shown in FIGS. 2(a) to 2(d), the alarm unit 110 may periodically sound an alarm, the voice conversation unit 120 may receive a voice input from a user, and the user may give various voice commands during reception of the voice input. Further, when the user moves or touches the terminal 100, when the user says "stop", or when the user directly presses a stop button of the terminal 100, in the middle of sounding the alarm, the sounding of the alarm from the alarm unit 110 is stopped, and then, a user voice input reception operation through the voice conversation unit 120 is performed.

In the voice input reception operation, if it is judged that the user provides unclear pronunciation to the terminal 100 and whether or not the terminal 100 receives a voice input from the user is obscure, the controller 150 may require re-input from the user.

Further, in the case of a morning call, unclear pronunciation may be provided, and an obscure voice input may be regarded as a positive response and thus a user information providing operation may be performed. After the user information providing operation has been started, if the user does not want user information provision and thus stoppage of user information provision is repeated, such an obscure voice input information is judged to have a negative meaning and the repetitive pattern thereof is stored.

Figure 2:
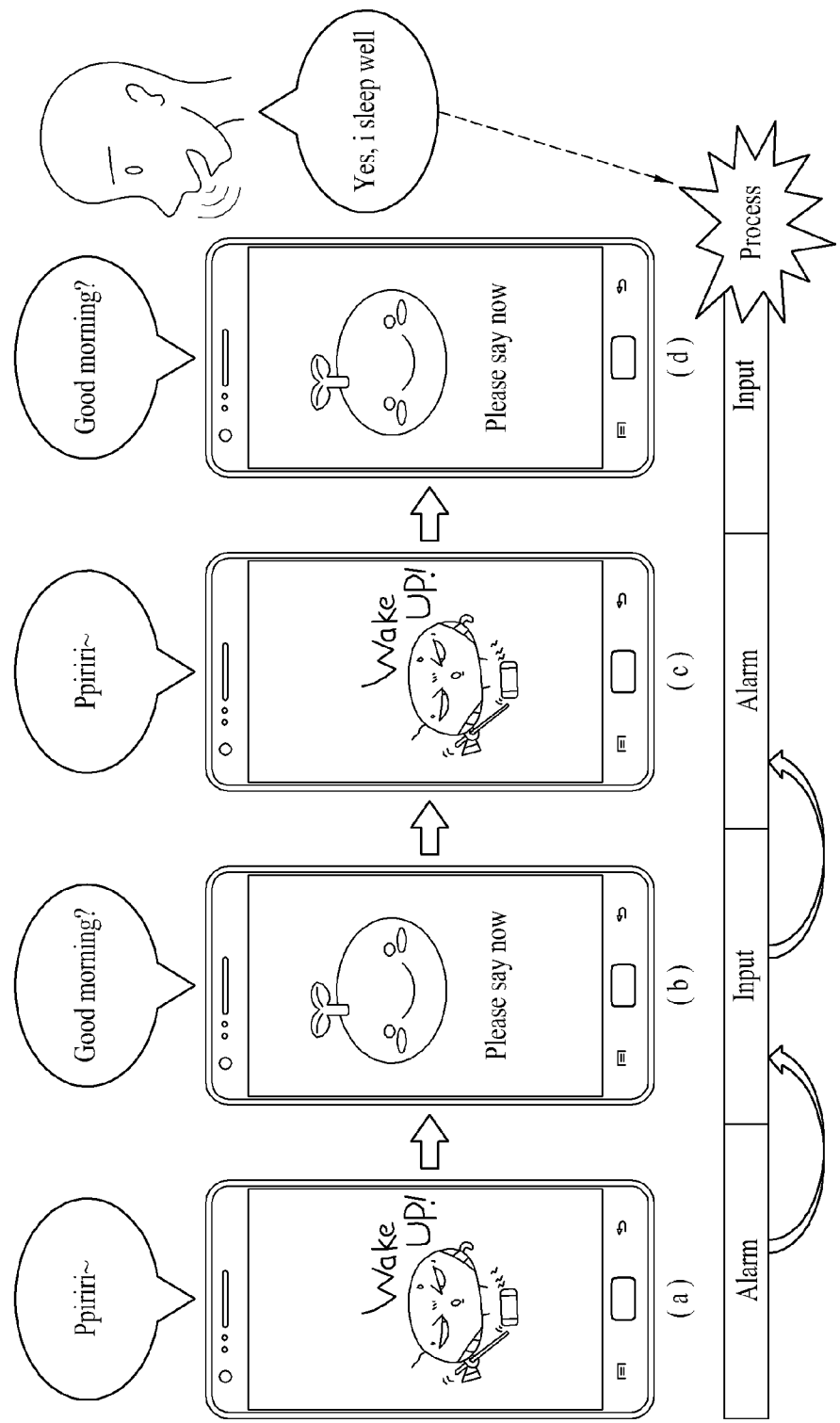
FIGS. 2(a) to 2(d) and FIGS. 3(a) to 3(d) are flowcharts illustrating a method for performing a voice conversation function between a user and a terminal in accordance with one embodiment of the present invention.
Figure 3:
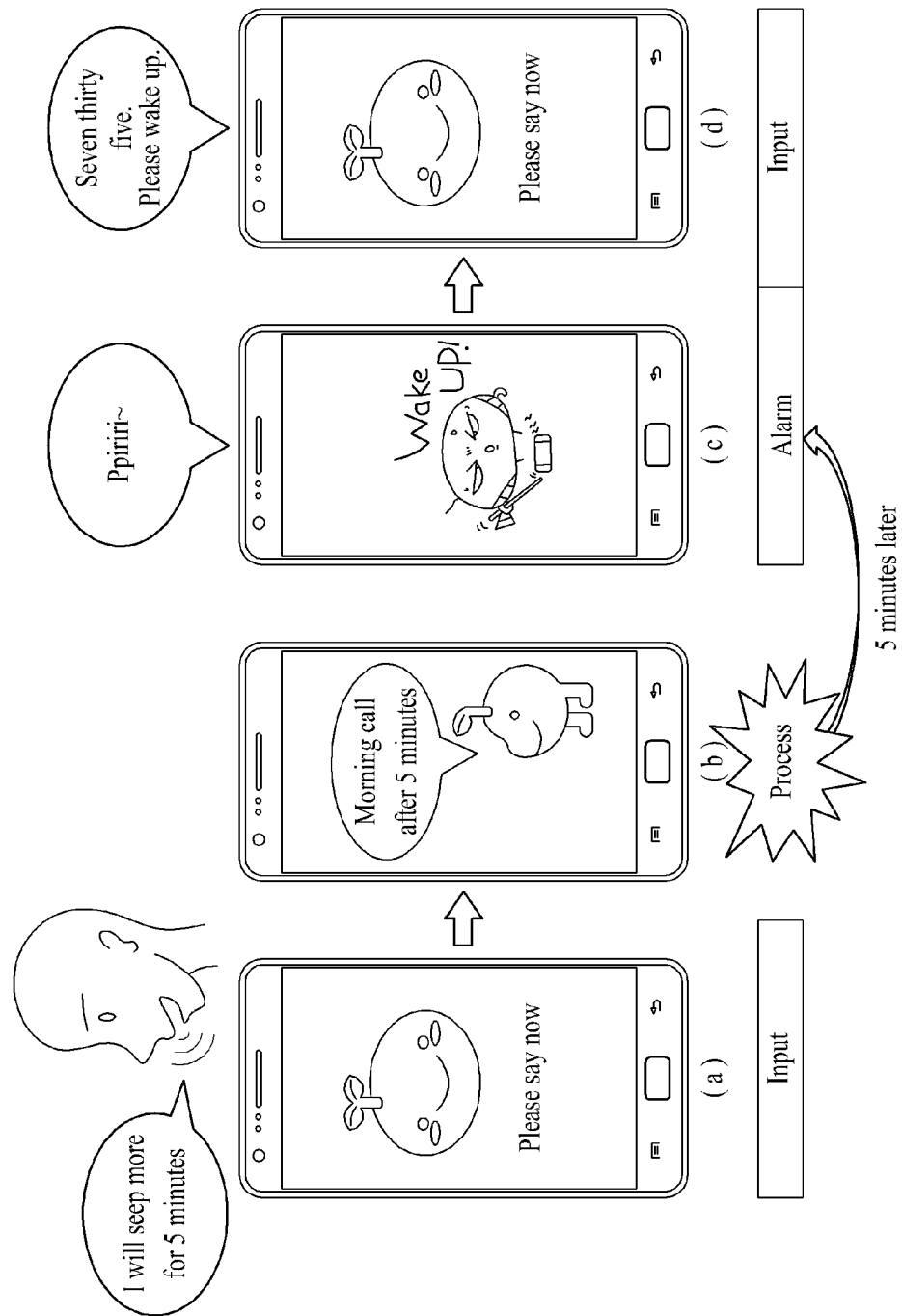
Figure 4:
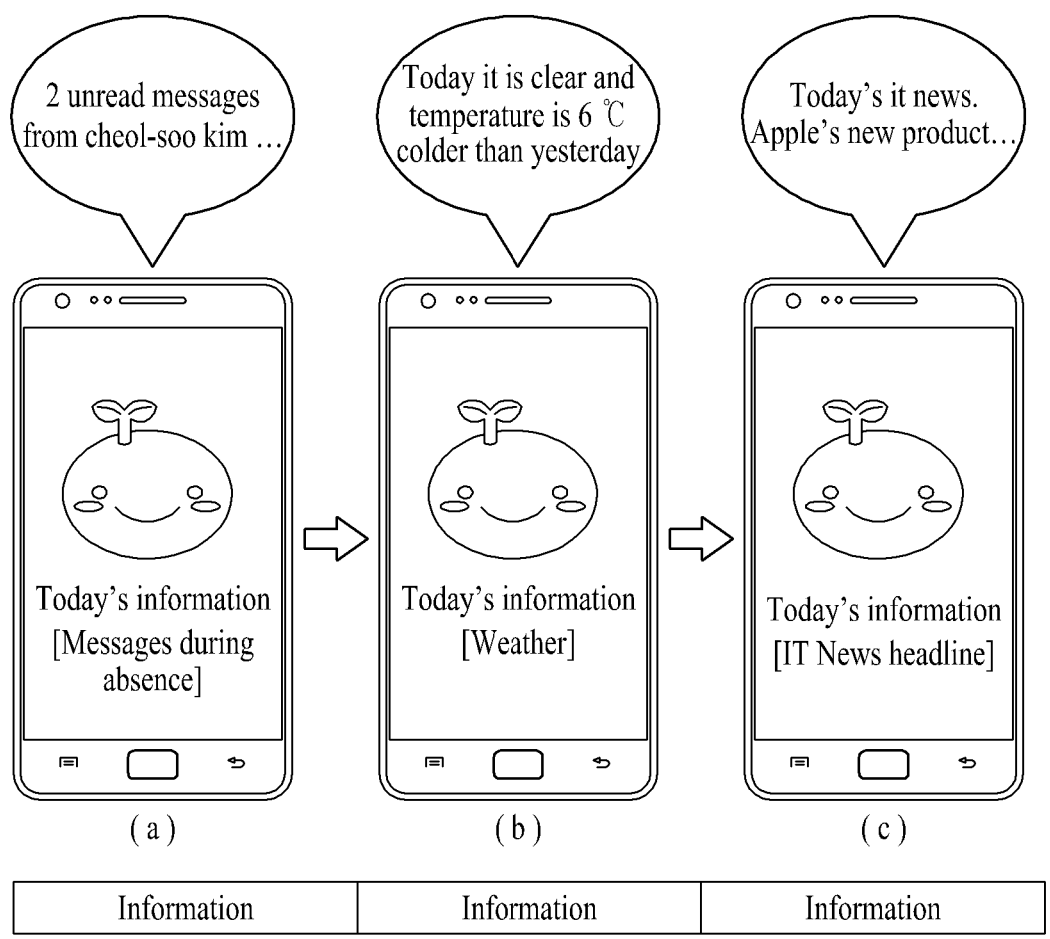
Figure 5:
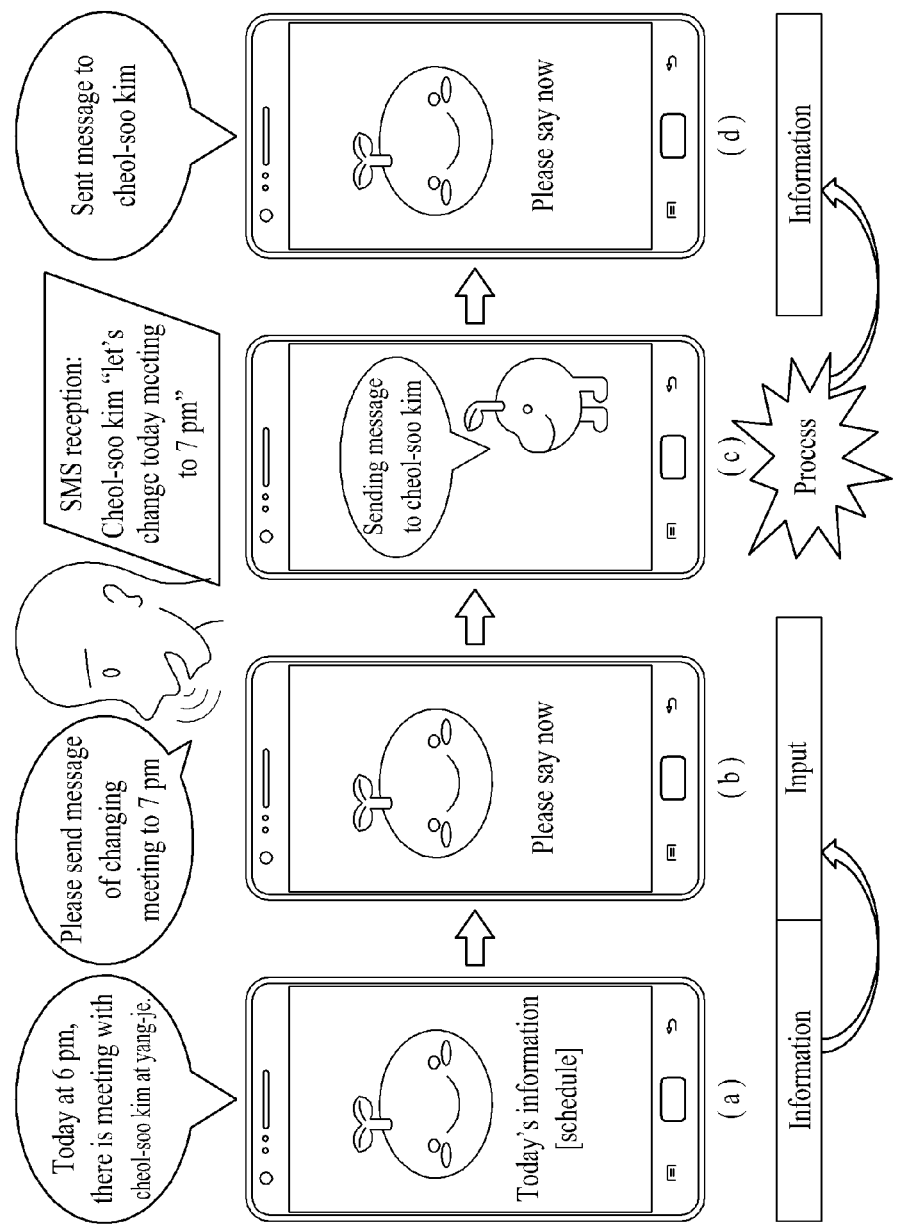
Figure 6:
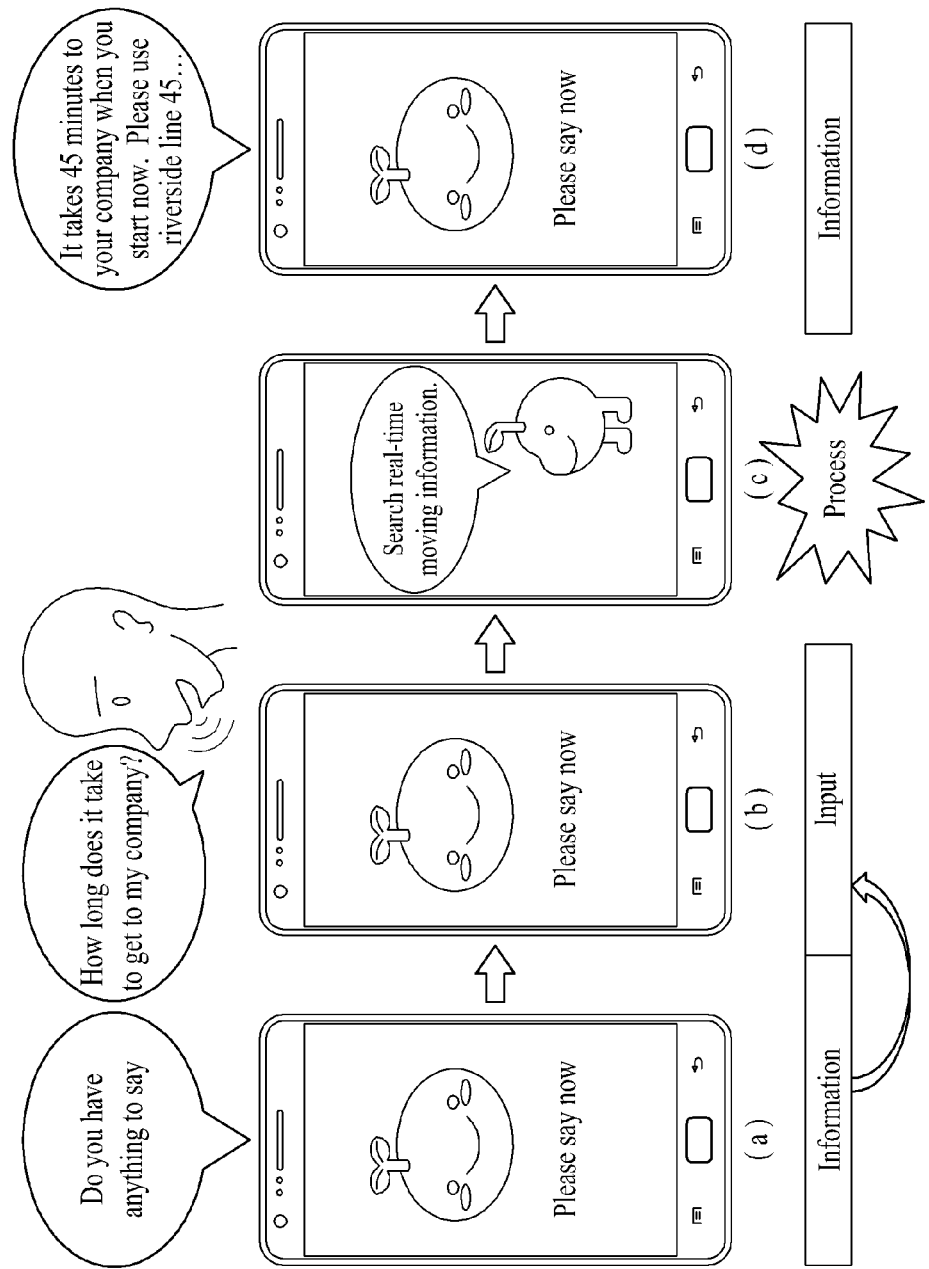

When the user moves the terminal 100 within 3 seconds after the terminal 100 has sound an alarm or 3 seconds from sounding of the alarm has elapsed, as shown in FIG. 2(a), the user voice input reception operation may be performed, as shown in FIG. 2(d). Further, when the terminal does not receive a voice input from the user, i.e., any response from the user, within 3 seconds, the terminal 100 re-sounds the alarm, as shown in FIG. 2(c). If the terminal 100 receives the voice input from the user, provision of personalized information different according to users and the voice conversation function between the user and the terminal 100 may be performed, as shown in FIG. 2(d).

Figure 11:
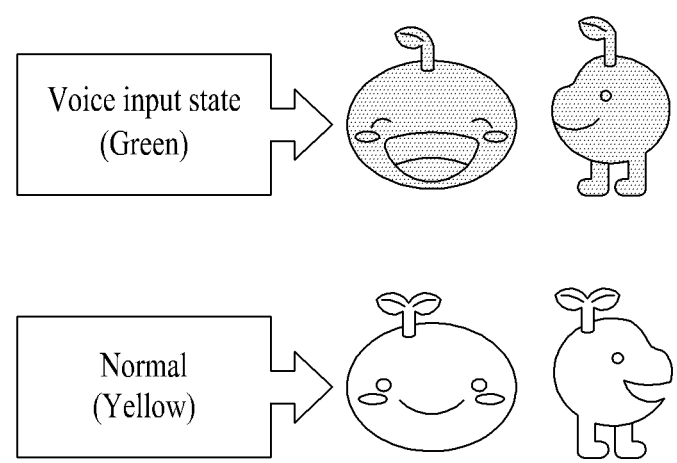

Further, as shown in FIG. 11, in the voice input reception operation, start and end of reception of the voice input from the user are displayed through color change of a specific character, thus being capable of being effectively indicated. For example, when a microphone-shaped character is green, the character may visually represent the progress state of the voice input, and when the microphone-shaped character is yellow, the character may visually represent the stopped state of the voice input.

As shown in FIGS. 3(a) to 3(d), if the user does not wake up, or if the user says to wake me up within N minutes, the terminal 100 may remember a voice command of the user and sounds a morning call after N minutes.

FIGS. 4(a) to 6(d) are flowcharts illustrating a user information providing method between a user and the terminal in accordance with the embodiment of the present invention.

If a user frequently requests the terminal 100 to confirm messages during absence ordinary times, the terminal 100 displays the messages during absence to the user after sounding of an alarm and reception of the voice input from the user, as shown in FIG. 4(a). If the user frequently requests the terminal 100 to provide weather information ordinary times, the terminal 100 automatically displays the weather information to the user without a user request, as shown in FIG. 4(b), and if the user frequently requests the terminal 100 to provide news information ordinary times, the terminal 100 automatically displays the news information to the user without a user request, as shown in FIG. 4(c). That is, the numbers of frequency of the items requested every day or frequently by the user in the morning call may be recorded, and N items in descending order of the numbers of frequency may be automatically briefed. Further, a voice input may be received if necessary according to items.

When the user information provision unit 130 displays today's schedule information shown in FIG. 5(a) to a user as text information, such text information is automatically changed into voice information, and the audio information is exposed to the user, the user may give a voice command to the terminal 100, as shown in FIG. 5(b). The terminal 100 having received the voice command from the user may execute the voice command to transmit a text message, as shown in FIG. 5(c), and then may display a result of the execution of the voice command to the user, as shown in FIG. 5(d).

As shown in FIGS. 6(a) to 6(d), the voice conversation unit 120 waits reception of a voice command from a user, and if the user gives a voice command regarding traffic information search to the terminal 100, the terminal 100 having received the voice command from the user executes the voice command and the user information provision unit 130 may display a result of the traffic information search to the user.

FIGS. 7 to 10 are plan views illustrating a database to record and modify the numbers of access times of a user to respective items of personalized information to provide user information between the user and the terminal 100 in accordance with the embodiment of the present invention.

The personalized information may include general information, such as weather, news and stocks, individual information, such as calls during absence, messages during absence, today's schedule and new SNS news, and customized information, such as temperature, traffic, etc. Particularly, in the present invention, the personalized information provision may be performed in descending order of the numbers of access times of the user to the respective items.

That is, the respective items of all the personalized information are scored and recorded in the database, and the scores of the respective items are modified through conversation with the user. Then, maximum N items in descending order of the scores may be selected.

Figure 8:
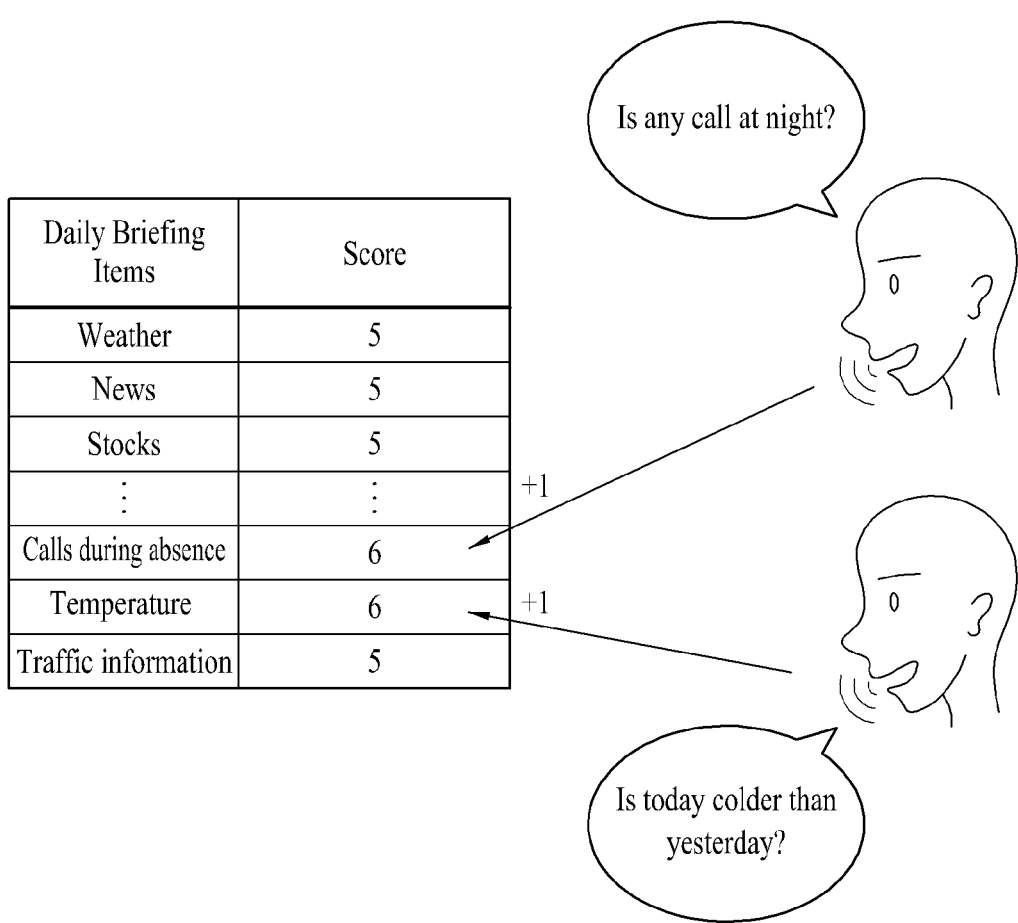
Figure 9:
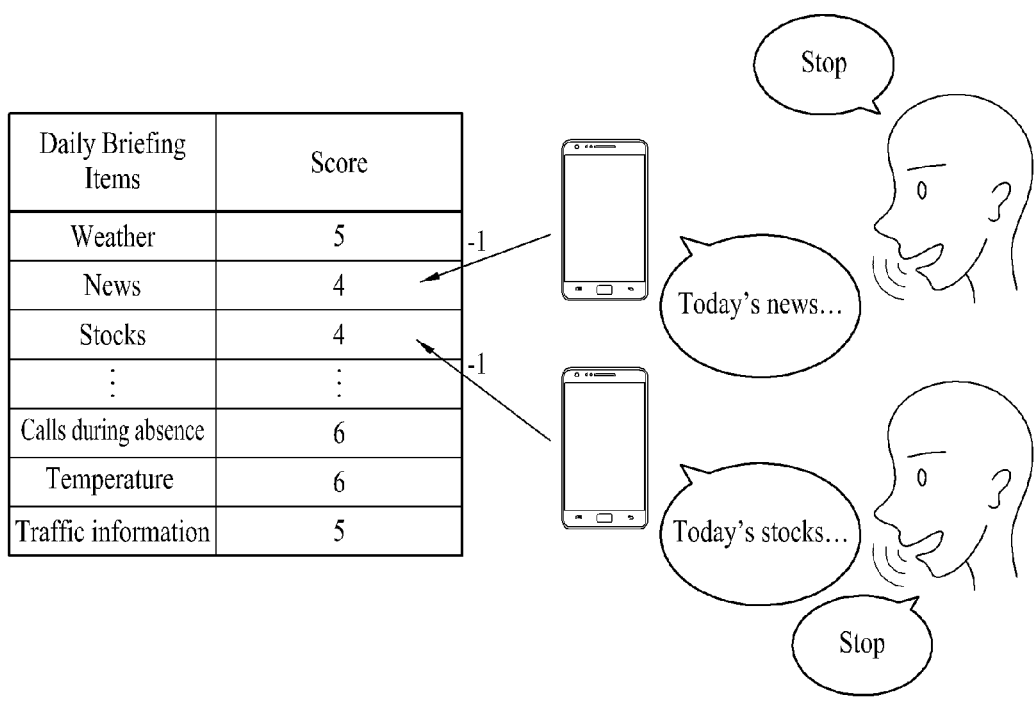

In more detail, as shown in FIG. 7, when the database is initially used, N items defined in advance, such as weather, news, stocks, calls during absence, temperature, traffic information, etc., are respectively scored and recorded in the database. Further, if there is/are (a) user information item(s) which the user requests the terminal 100 to provide, i.e., if the user requests the terminal 100 to provide calls during absence and temperature, the scores of a call item during absence and a temperature information item are respectively increased by 1 and the increased scores are recorded in the database, as shown in FIG. 8. On the other hand, if there is an information provision stoppage command of (a) user information item(s) to be provided by the terminal 100 from the user, i.e., if the user gives a command to stop provision of news information and stock information, the scores of a news item and a stock item are respectively decreased by 1 and the decreased scores are recorded in the database, as shown in FIG. 9.

Figure 10:
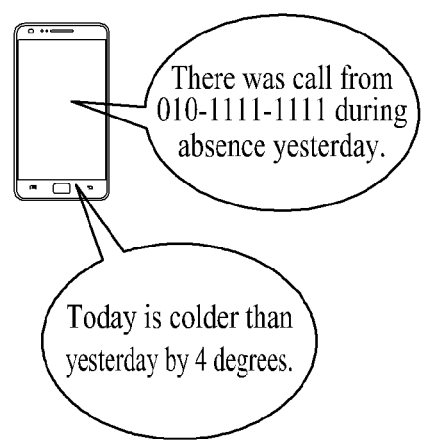

Further, if user information provision between the user and the terminal 100 is necessary later and 2 uppermost items are set, the terminal 100 may automatically display the items having the highest scores recorded in the database, i.e., the items of the messages during absence and the temperature information, may be displayed to the user, as shown in FIG. 10.

As is apparent from the above description, a smart alarm providing terminal and an alarm providing method thereof in accordance with the present invention enable an interactive morning call and provision of daily information personalized to respective users by combining a voice conversation function and a personalized information provision function with an alarm provision function of a smart phone, thereby effectively performing a morning call voice recognition function.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A smart alarm providing terminal comprising:
   an alarm unit to drive an alarm of the terminal;
   a voice conversation unit to perform a voice conversation function between a user and the terminal;
   a user information provision unit to provide different personalized information according to respective users;
   a memory unit to store data to perform the voice conversation function and to provide the personalized information; and a controller to control the voice conversation unit and the user information provision unit so as to enable the voice conversation function and provision of the personalized information when the alarm of the terminal is driven,
wherein the controller regards an obscure voice input as a positive response and controls the user information provision unit to provide the personalized information,
the controller further controls the memory unit to store the repetitive pattern if stoppage of user information provision is repeated after the user information providing operation is started, and
the controller regards another obscure voice input as a negative response based on the stored repetitive pattern and controls the user information provision unit to not provide the personalized information.

2. The smart alarm providing terminal according to claim 1, further comprising a display unit to display start and end of reception of a voice input from the user through color change of a specific character.

3. The smart alarm providing terminal according to claim 1, wherein the voice conversation unit receives a voice input from the user, if the alarm unit periodically drives the alarm.

4. The smart alarm providing terminal according to claim 3, wherein the controller, if the user touches the terminal, judges such touch to be generation of the voice input, and transmits a voice input signal to the voice conversation unit.

5. The smart alarm providing terminal according to claim 3, wherein:
the voice input includes an onomatopoeic word indicating stoppage of alarm driving; and
when the controller receives the onomatopoeic word indicating stoppage of alarm driving from the user, the controller stops driving of the alarm by the alarm unit.

6. The smart alarm providing terminal according to claim 3, wherein the controller stops driving of the alarm by the alarm unit, when the user presses or touches an alarm driving stoppage button of the alarm unit.

7. The smart alarm providing terminal according to claim 5, wherein, if the controller judges that whether or not the received voice input is the onomatopoeic word indicating stoppage of alarm driving is obscure, the controller requires re-input from the user.

8. The smart alarm providing terminal according to claim 1, wherein the personalized information includes information regarding weather, news, stocks, calls during absence, messages during absence, temperature and traffic.

9. The smart alarm providing terminal according to claim 1, wherein the memory unit stores database information to record and modify the numbers of user access times to the respective items of the personalized information.

10. The smart alarm providing terminal according to claim 9, wherein the user information provision unit performs provision of the personalized information in descending order of the numbers of user access times to the respective items of the personalized information.

11. The smart alarm providing terminal according to claim 1, wherein the terminal includes a smart phone or a smart TV.

12. An alarm providing method of a smart alarm providing terminal comprising:
periodically driving an alarm of the terminal;
receiving a voice input from a user;
providing different personalized information according to respective users;
performing a voice conversation function between the user and the terminal;
regarding an obscure voice input as a positive response and then providing the personalized information;
storing the repetitive pattern into a memory if stoppage of user information provision is repeated after the user information providing operation is started; and
regarding another obscure voice input as a negative response based on the stored repetitive pattern.

13. The alarm providing method according to claim 12, wherein it is judged that the voice input is generated if the user touches the terminal.

14. The alarm providing method according to claim 12, wherein:
the voice input includes an onomatopoeic word indicating stoppage of alarm driving; and
when the controller receives the onomatopoeic word indicating stoppage of alarm driving from the user, driving of the alarm of terminal is stopped.

15. The alarm providing method according to claim 14, wherein driving of the alarm of the terminal is stopped, when the user presses or touches an alarm driving stoppage button of the alarm unit.

16. The alarm providing method according to claim 14, if it is judged that whether or not the voice input received by the terminal is the onomatopoeic word indicating stoppage of alarm driving is obscure, further comprising requiring re-input from the user.

17. The alarm providing method according to claim 12, wherein the personalized information includes information regarding weather, news, stocks, calls during absence, messages during absence, temperature and traffic.

18. The alarm providing method according to claim 17, wherein the numbers of user access times to the respective items of the personalized information are recorded and stored in a database.

19. The alarm providing method according to claim 18, wherein provision of the personalized information is performed in descending order of the numbers of user access times to the respective items of the personalized information.

20. The alarm providing method according to claim 12, further comprising allowing the terminal to display start and end of reception of the voice input from the user through color change of a specific character.

* * * * *